United States Patent
Marka et al.

[11] Patent Number: 5,685,661
[45] Date of Patent: Nov. 11, 1997

[54] ROTATION JOINT

[75] Inventors: Rudolf Marka, Darmstadt; Uwe Gampe, Flörsheim, both of Germany

[73] Assignee: Heraeus Med GmbH, Hanau, Germany

[21] Appl. No.: 605,730

[22] Filed: Feb. 22, 1996

[30] Foreign Application Priority Data

Mar. 24, 1995 [DE] Germany ............... 195 10 752.7

[51] Int. Cl.⁶ ............... F16C 11/10; F21V 21/14
[52] U.S. Cl. ............... 403/166; 403/164; 403/120; 403/112
[58] Field of Search ............... 403/343, 117, 403/113, 112, 120, 119, 166, 164, 163; 248/289.11, 291.12, 292.13; 16/325, 303, 296, 284

[56] References Cited

U.S. PATENT DOCUMENTS

| 996,413 | 6/1911 | Katzenberger | 16/284 |
|---|---|---|---|
| 1,056,171 | 3/1913 | Henry | 16/284 X |
| 1,302,569 | 5/1919 | Lemke | 16/284 |
| 1,386,621 | 8/1921 | Hughes | 16/284 |
| 2,717,141 | 9/1955 | Livingston | 403/166 X |
| 2,729,473 | 1/1956 | Warshawsky | 248/289.11 X |
| 3,730,474 | 5/1973 | Bowers | 248/289.11 X |
| 4,494,273 | 1/1985 | Straus | 16/303 X |

FOREIGN PATENT DOCUMENTS

| 0 636 815 A1 | 2/1995 | European Pat. Off. |
| A 548 834 | 1/1923 | France. |
| A 2 142 905 | 2/1973 | France. |
| 3014283 C2 | 7/1984 | Germany. |
| 41 03 182 A1 | 6/1992 | Germany. |

Primary Examiner—Anthony Knight
Attorney, Agent, or Firm—Panitch Schwarze Jacobs & Nadel, P.C.

[57] ABSTRACT

A rotation joint has two joint elements arranged for rotation with respect to each other about an axle, a cam ring arranged coaxial to the axle in a housing and having a curved track with a spatial curvature, a spring guide element arranged on the axle with springs disposed coaxial to the axle around the spring guide element, and bolts mounted radial to the axle and having bearings whose outer circumference lies in force-transmitting relation on the curved track. In order to make a rotation joint with weight compensation which guarantees sure functioning, and at the same time can be produced economically by a simple construction and a compact structure, the housing is essentially formed by the two joint elements. The spring guide element is rigidly connected with a first joint element, and the cam ring is arranged on the spring guide element and capable of axial motion, but the second joint element is locked against a movement in the direction of the axle, and the bolts are fixed in the second joint element.

13 Claims, 4 Drawing Sheets

ROTATION JOINT

FIELD OF THE INVENTION

The invention concerns a rotation joint with two joint elements arranged for rotation with respect to each other about an axle, with a cam ring arranged in a housing coaxial to the axle, the cam ring having a curved track with a spatial curvature, with a spring guide element arranged coaxial to the axle and with a spring mounted coaxial to the axle along the spring guide element, whereby bolts arranged radial to the axle have bearings whose outer circumference lies in a non-positive force transmitting manner on the curved track.

BACKGROUND OF THE INVENTION

A rotationally mounted supporting arm with weight compensation (counterbalancing) of the type described above is known from DE 30 14 283 C2. According to this device the centrally arranged spring guide element is moved. Thrust washers holding the bolts are movably mounted on it. The cam ring is installed in a stationary manner in the housing. Large forces from the spring guide element must be transmitted through the bolts to the cam ring during a movement of the spring guide element as a consequence of an adjusting movement of the suspension device described. The bearing of the bolts is nonetheless only capable of absorbing small forces in the circumstances, so that the weight compensation sought with the device is restricted to relatively small weights. Construction of the device is very expensive and, for the reasons indicated, not suited for compensating for greater weights as they occur, for example, in medical devices.

SUMMARY OF THE INVENTION

On the basis of the state of the art described above, the object underlying the invention is to produce a rotation joint with weight compensation which guarantees a sure functioning and which at the same time can be manufactured economically with a simple and compact construction.

According to the invention, the objective for the rotation joint characterized at the beginning is fulfilled, in that the housing is essentially constructed from the two joint elements, that the axle is rigidly connected with a first joint element, that the cam ring is axially mobile and securely mounted against rotation, that the second joint element is locked against a movement in the direction of the axle, and that the bolts are fixed in the second joint element. An arrangement of this type is very simply constructed. The number of moving parts is restricted to a minimum, and the bolts are stably mounted, so that greater forces can be transmitted. The rotation joint has a relatively large range of rotation. The forces of friction to be overcome are small and the device can be adjusted precisely. A particularly stable mounting of the bolts results therefrom, where the bolts are held bilaterally.

The spring guide element is preferably formed by the axle. It is, however, also conceivable to guide the springs externally, i.e., by means of the housing. The cam ring is expediently mounted on the axle. Alternatively, it is possible to install the cam ring on the housing.

It is advantageous if the spring guide element is of cylindrical construction. Furthermore, it is expedient for the second joint element to be locked axially on the axle, in particular that it be mounted on the axle by means of an axial thrust bearing. Such configurations simplify the construction and assure small frictional forces.

It is furthermore advantageous that the axle have means for axial guidance of the cam ring, in particular that the means for axial guidance are constructed as cylindrical pins which engage in recesses in the inner periphery of the cam ring. This assures in a simple way that the cam ring cannot be rotated. The axle is expediently fixed on a stop plate, which is rigidly mounted on the first joint element and arranged essentially perpendicular to the axle. It is furthermore advantageous that the bearings mounted on the bolts be constructed as needle (roller) bearings.

An advantageous construction of the rotation joint results when the two bolts are arranged lying opposite each other, whereby the radial distance between the bolts is larger than the diameter of the thrust bearing, since the thrust bearing can thereby be arranged between the bolts, and the size of the rotation joint is diminished in this way. In a further advantageous construction, the cam ring has two limit stops for each of the respective bearings in order to limit the rotational motion and prevent damage to the rotation joint.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF PREFERRED EMBODIMENT

Figure 1:
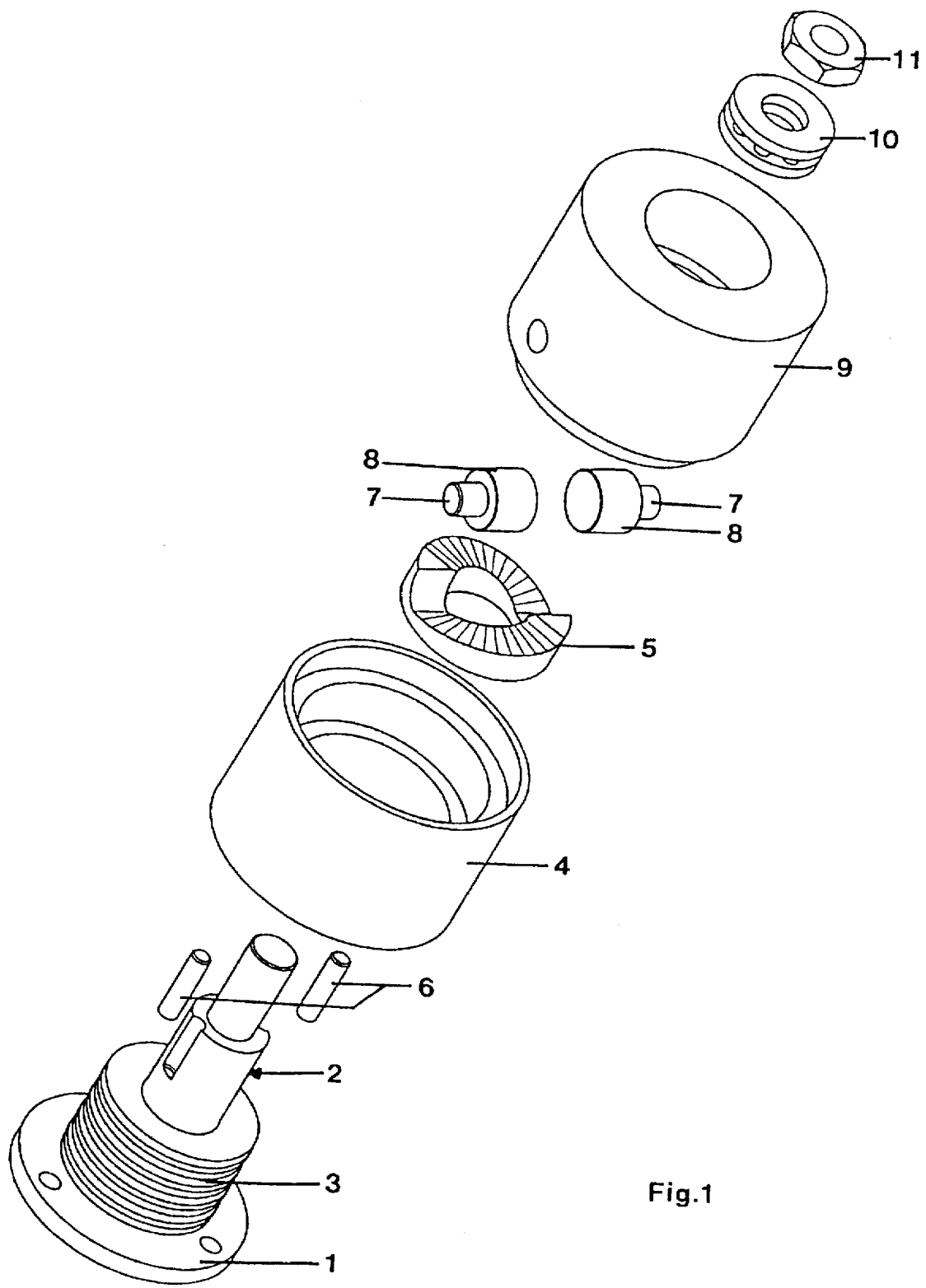
FIG. 1 is an exploded view of a rotation joint, according to the invention.

The axle 2, which axially forms the cylindrical spring guide element and on which the spring 3 is set, is mounted on a stop plate 1 arranged perpendicularly to the axle. The spring 3 can be constructed as a series of cup or disk springs, or a coil spring, or in some other form as well. The stop plate 1 is rigidly connected with the first joint element 4. The joint element 4 encloses the spring 3. The cam ring 5 is set upon the axle 2 and is locked against rotation by cylindrical pins 6 mounted in grooves of the axle 2. The cam ring 5 has two inclines, on which two bolts 7 are guided each by means of one needle bearing 8.

The bolts 7 are tightly seated into recesses of the second joint element 9, and are moved around the axle as soon as the second joint element 9 is moved. The second joint element 9 engages in the first joint element 4. It has a bore arranged on the longitudinal axis, through which the end of the axle 2 is guided. A thrust bearing 10 is installed on this end and locked with a nut 11 on the end of axle 2 which is provided with a thread. The thrust bearing 10 is thereby installed in a recess of the second joint element 9. The spring tension can be altered with the aid of the nut 11, and the rotation joint can thereby be simply adjusted to various masses.

Hinged brackets (not illustrated in the drawing) are fastened to both joint elements 4, 9. These hinged brackets can, for example, be constructed as a stand and supporting arm of a lamp, for example a medical lamp.

When the second joint element 9 is rotated with respect to the first joint element 4, the bolts 7 are guided on the inclines of the cam ring 5. The spring 3 is thereby either strained or relieved depending upon the direction of rotation.

Figure 2:
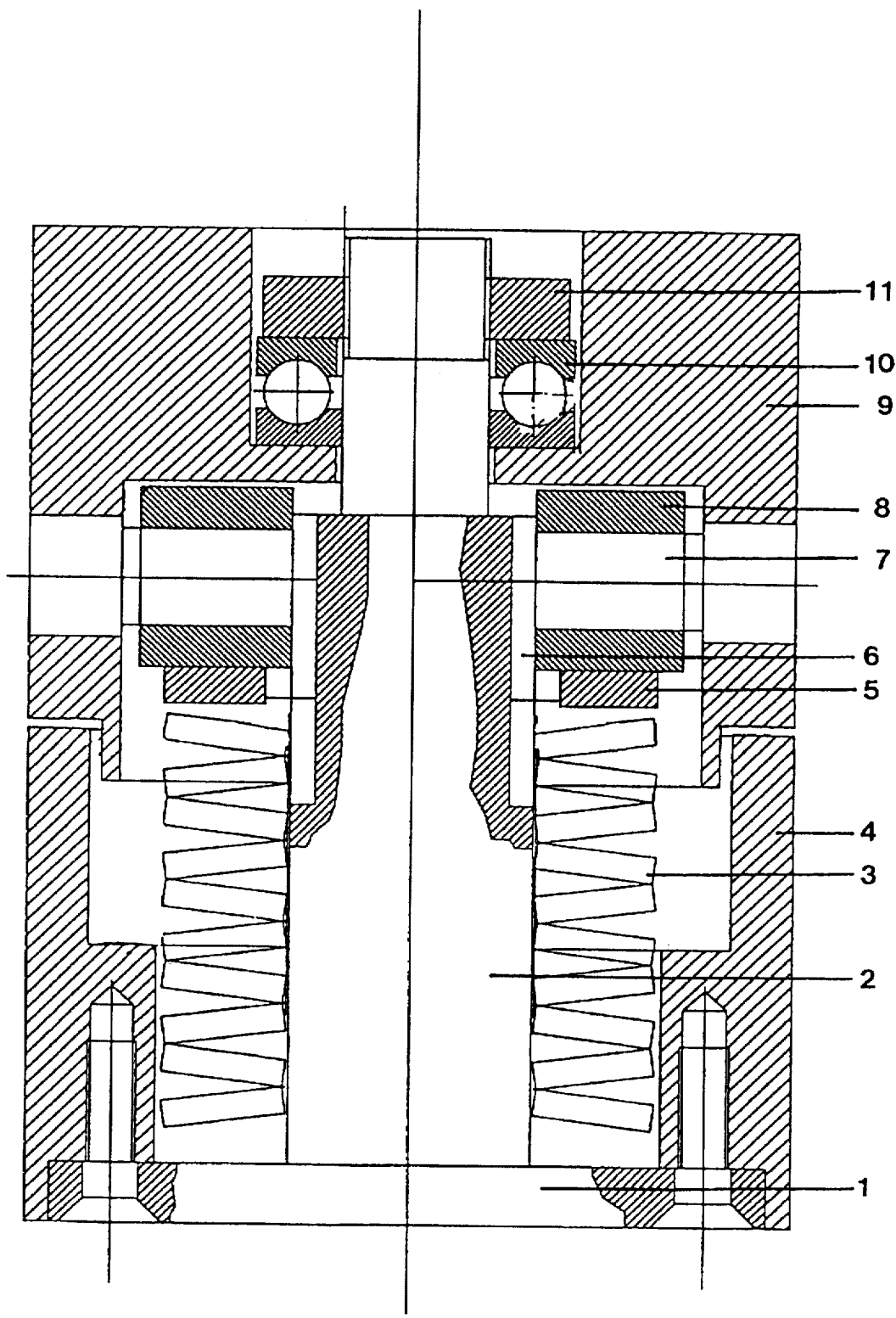
FIG. 2 is a longitudinal section through the rotation joint.

While FIG. 1 depicts an exploded representation of the rotation joint, FIG. 2 shows a longitudinal section through the rotation joint.

Figure 3:
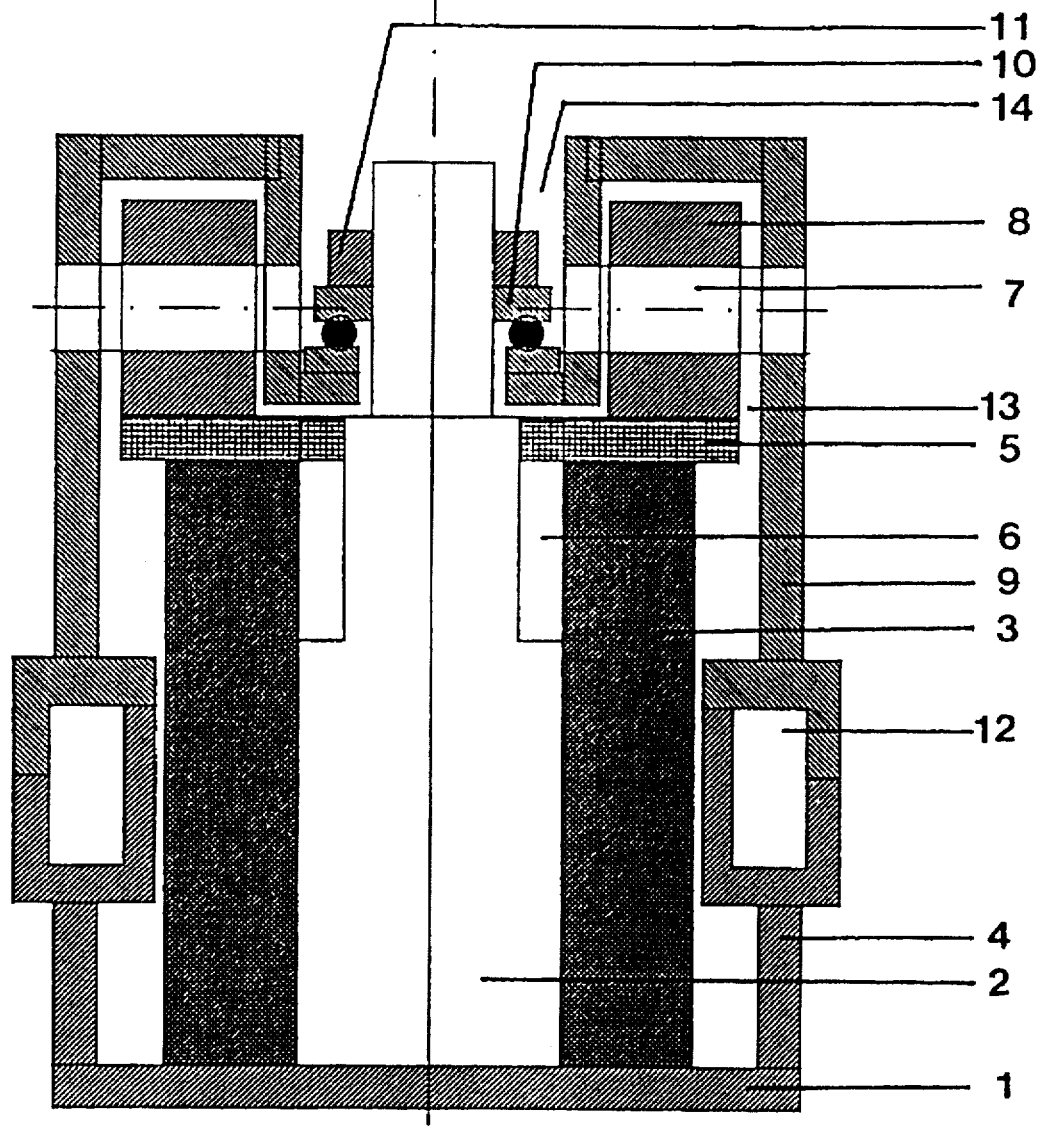
FIG. 3 is a longitudinal section through a further embodiment of the rotation joint according to the invention.

FIG. 3 depicts another embodiment of the rotation joint in according to the invention. This embodiment differs from the first embodiment essentially by a bilateral mounting of the bolts 7 in the second joint element 9. This joint element 9 is constructed as a housing element which has a ring-shaped hollow space 13 on its free end in which the bolts 7 are mounted with needle bearings 8. The bolts 7 are fixed bilaterally in the sides of the hollow space 13. The ring-shaped hollow space 13 encloses an interior space 14, in which the thrust bearing 10 is installed on the end of the axle 2 and is locked by the nut 11. The thrust bearing 10 is thereby arranged between the bolts 7.

The ends of the first joint element 4 and the second embodiment joint element 9 which face each other form a cableway 12, which makes possible the running of cables when using the rotation joint, for example for lamps. This second embodiment has the advantage of being executed very stably on the one hand and being very compact on the other. The stability resides, among other things, in the bilateral mounting of the bolts, while the compactness resides in the possibility of placing the thrust bearing 10 between the bolts 7.

Figure 4:
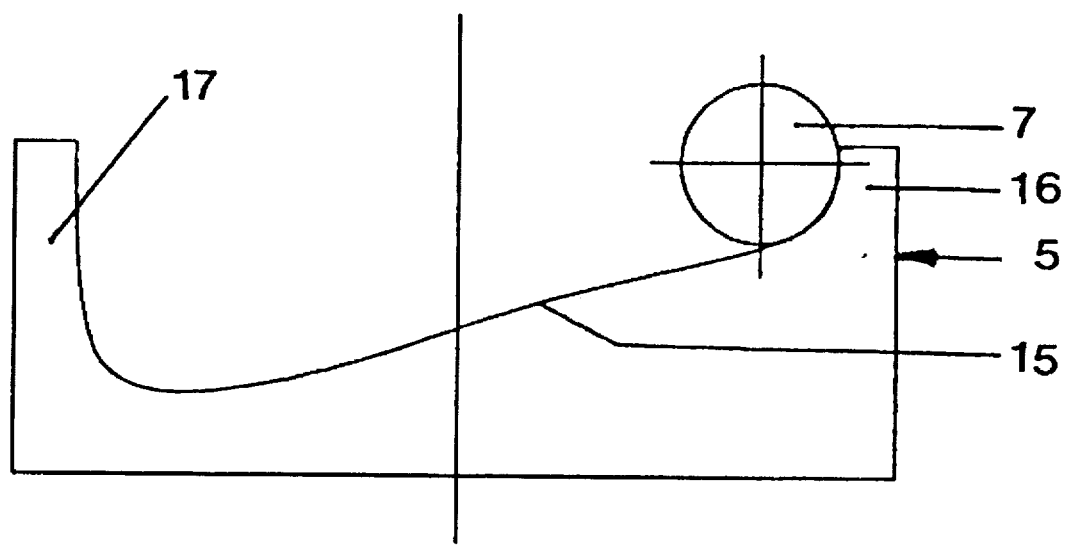
FIG. 4 is a schematic representation of a side view of the cam ring of the rotation joint.

The lateral view of the cam ring 5 is shown schematically in FIG. 4. End stops 16, 17 are arranged on both sides of the incline 15, in order to limit the path of rotation, in order to avoid damage to the rotation joint.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. (Amended) A rotation joint with weight compensation comprising first and second joint elements (4, 9) arranged for rotation with respect to each other about an axle (2), a cam ring (5) arranged in a housing coaxial to the axle, the cam ring having a curved track with a spatial curvature, a spring guide element arranged coaxial to the axle, a spring (3) mounted coaxial to the axle along the spring guide element, and bolts (7) arranged radial to the axle and having bearings (8) whose outer circumference lies in force-transmitting relation on the curved track, wherein the housing is essentially formed by the first and second joint elements (4, 9), the axle (2) is rigidly connected with the first joint element (4), the cam ring (5) is axially movable but fixed against rotation, the second joint element (9) is locked against movement in a direction of the axle, and the bolts (7) are fixed in the second joint element (9), such that the first joint element is maintained in any desired rotational position relative to the second joint element by the bearings (8) acting on the curved track to strain or relieve the spring to provide weight compensation depending on a direction of rotation.

2. The rotation joint according to claim 1, wherein the spring guide element is formed by the axle (2).

3. The rotation joint according to claim 1, wherein the cam ring (5) is mounted on the axle (2).

4. The rotation joint according to claim 3, wherein the axle (2) has means for axial guiding of the cam ring (5).

5. The rotation joint according to claims 4, wherein the means for axial guiding are constructed as cylindrical pins (6) which engage in recesses of an inner periphery of the cam ring (5).

6. The rotation joint according to claim 1, wherein the bolts (7) are mounted bilaterally.

7. The rotation joint according to claim 1 wherein the spring guide element has a cylindrical form.

8. The rotation joint according to claim 1 wherein the second joint element (9) is axially locked on the axle (2).

9. The rotation joint according to claim 1, wherein the second joint element (9) is mounted on the axle (2) by means of a thrust bearing (10).

10. The rotation joint according to claim 9, wherein two bolts (7) are arranged lying opposite each other, whereby a radial distance of the two bolts (7) from each other is greater than the a diameter of the thrust bearing (10).

11. The rotation joint according to claim 10 wherein the cam ring (5) has two end stops (16, 17) for the two respective bolts (7).

12. The rotation joint according to claim 1, wherein the axle (2) is fixed on a stop plate (1) which is rigidly mounted on the first joint element (4) and is arranged essentially perpendicular to the axle (2).

13. The rotation joint according to claim 1, wherein the bearings (8) are constructed as needle bearings.

* * * * *